United States Patent
Cai et al.

(10) Patent No.: US 11,609,323 B2
(45) Date of Patent: Mar. 21, 2023

(54) ULTRA-WIDEBAND GROUND PENETRATING RADAR CONTROL SYSTEM

(71) Applicant: Nantong Institute of Nanjing University of Posts and Telecommunications Co., Ltd., Jiangsu (CN)

(72) Inventors: Zhikuang Cai, Jiangsu (CN); Xuanchen Qi, Jiangsu (CN); Wenhua Lin, Jiangsu (CN); Ji Wang, Jiangsu (CN); Jian Xiao, Jiangsu (CN); Yufeng Guo, Jiangsu (CN)

(73) Assignee: Nantong Institute of Nanjing University of Posts and Telecommunications Co., Ltd., Jiangsu (CN)

( * ) Notice: Subject to any disclaimer, the term of this patent is extended or adjusted under 35 U.S.C. 154(b) by 426 days.

(21) Appl. No.: 17/043,671

(22) PCT Filed: Jan. 14, 2019

(86) PCT No.: PCT/CN2019/071518
§ 371 (c)(1),
(2) Date: Sep. 30, 2020

(87) PCT Pub. No.: WO2019/237732
PCT Pub. Date: Dec. 19, 2019

(65) Prior Publication Data
US 2021/0364627 A1    Nov. 25, 2021

(30) Foreign Application Priority Data

Jun. 11, 2018    (CN) .......................... 201810592473.3

(51) Int. Cl.
*G01S 13/88*    (2006.01)
*G01S 19/14*    (2010.01)
(Continued)

(52) U.S. Cl.
CPC ............ *G01S 13/885* (2013.01); *G01S 19/14* (2013.01); *G05B 19/4155* (2013.01); *H04L 7/0008* (2013.01); *G05B 2219/45016* (2013.01)

(58) Field of Classification Search
CPC .... G01S 13/0209; G01S 13/86; G01S 13/885; G01S 19/14; G01S 19/35; G05F 2219/45016; G05F 19/042; H04L 7/0008
See application file for complete search history.

(56) References Cited

U.S. PATENT DOCUMENTS

| | | | | |
|---|---|---|---|---|
| 5,325,095 A | * | 6/1994 | Vadnais | G01S 13/32 342/194 |
| 10,663,579 B2 | * | 5/2020 | Stanley | B60W 40/06 |

(Continued)

FOREIGN PATENT DOCUMENTS

| | | |
|---|---|---|
| CN | 104155640 | 11/2014 |
| CN | 204347243 | 5/2015 |

(Continued)

OTHER PUBLICATIONS

"International Search Report (Form PCT/ISA/210)" of PCT/CN2019/071518, dated Mar. 28, 2019, pp. 1-4.

*Primary Examiner* — Olumide Ajibade Akonai
(74) *Attorney, Agent, or Firm* — JCIP Global Inc.

(57) ABSTRACT

An ultra-wideband ground penetrating radar control system, comprising a synchronous clock generating circuit, a GPS positioning module, a measuring wheel encoder module, a digitally controlled delay circuit for equivalent sampling, an analog-to-digital conversion (ADC) circuit, and a main controller. The synchronous clock generating circuit, the GPS positioning module, the measuring wheel encoder module, the digitally controlled delay circuit and the ADC circuit are all connected to the main controller. The synchronous clock generating circuit is further connected to an external ultra-wideband radar transmitter. The digitally con- (Continued)

trolled delay circuit is further connected to an external sampling pulse generation circuit for equivalent sampling. The ADC circuit is further connected to an external sampling gate for equivalent sampling. The main controller is further connected to an external server via Ethernet. The volume of an ultra-wideband ground penetrating radar control system is reduced. The connecting cables of the system is simplified. The reliability of the ultra-wideband radar system is improved.

1 Claim, 6 Drawing Sheets

(51) Int. Cl.
  *G05B 19/4155* (2006.01)
  *H04L 7/00* (2006.01)

(56) References Cited

U.S. PATENT DOCUMENTS

| 10,901,079 B2* | 1/2021 | Wilens | F41H 11/136 |
| 2016/0342433 A1* | 11/2016 | Renes | G01C 21/165 |

FOREIGN PATENT DOCUMENTS

| CN | 107991709 | 5/2018 |
| CN | 108549301 | 9/2018 |
| JP | 2009052959 | 3/2009 |
| JP | 5126911 | 1/2013 |

* cited by examiner

ULTRA-WIDEBAND GROUND PENETRATING RADAR CONTROL SYSTEM

CROSS-REFERENCE TO RELATED APPLICATION

This application is a 371 of international application of PCT application serial no. PCT/CN2019/071518, filed on Jan. 14, 2019, which claims the priority benefit of China Patent Application No. 201810592473.3, filed on Jun. 11, 2018. The entirety of each of the above mentioned patent applications is hereby incorporated by reference herein and made a part of this specification.

TECHNICAL FIELD

The present invention relates to the technical field of ground penetrating radars, and in particular to a control system for ultra-wideband ground penetrating radars.

BACKGROUND

In recent years, ultra-wideband ground penetrating radars have been used for the detection of potential safety hazards under municipal underground pipelines and transportation facilities. The operational principle is that the radar emits ultra-wideband pulsed electromagnetic wave signals below the ground, and due to the different distribution of various underground media, the ultra-wideband pulsed electromagnetic wave signals reflected by the media are different in amplitude and propagation time. Ultra-wideband ground penetrating radars can obtain the distribution of various underground media by processing the received reflected signals, thereby analyzing the potential safety hazards under the road.

Traditional ultra-wideband ground penetrating radars use a computer as a main control device, and such radar systems all use a high-cost data acquisition device such as a data acquisition card, resulting in large overall volume and high cost of the radars.

SUMMARY

Objective of the invention: to overcome the shortcomings existing in the prior art, the present invention provides an ultra-wideband ground penetrating radar control system with high reliability, small volume and low cost.

Technical solution: to achieve the above objective, the present invention adopts the following technical solution:

An ultra-wideband ground penetrating radar control system, comprising a synchronous clock generating circuit, a GPS positioning module, a measuring wheel encoder module, a digitally controlled delay circuit for equivalent sampling, an analog-to-digital conversion circuit, and a main controller, wherein the synchronous clock generating circuit, the GPS positioning module, the measuring wheel encoder module, the digitally controlled delay circuit and the analog-to-digital conversion circuit are all connected to the main controller; the synchronous clock generating circuit is connected to an ultra-wideband transmitter and receiver; the digitally controlled delay circuit and the analog-to-digital conversion circuit are connected to an external sampling gate for equivalent sampling; and the main controller is connected to an external server.

Preferably, the synchronous clock generating circuit comprises a crystal oscillator Y1, a chip U2, a first resistor R1, a fifth resistor R5, a sixth resistor R6, a 50th resistor R50, a first capacitor C1, a second capacitor C2, a third capacitor C3, a fifth capacitor C5, a 50th capacitor C50, a first inductor L1 and a second inductor L2, wherein a first pin of the crystal oscillator Y1 is connected to the positive electrode of a power supply via the first inductor L1; one terminal of the second capacitor C2 is connected to the first pin of the crystal oscillator Y1, the other terminal is grounded; one terminal of the first capacitor C1 is connected to the positive electrode of the power supply, the other terminal is connected to the ground terminal of the second capacitor C2; one terminal of the fifth resistor R5 is connected to a second pin of the crystal oscillator Y1, the other terminal is connected to a first pin and a second pin of the chip U2; third, fourth, fifth, ninth, 10th, 11th and 13th pins of the chip U2 are connected together; a 14th pin of the chip U2, the positive electrode of the power supply and one terminal of the 50th capacitor C50 are connected, and the other terminal of the 50th capacitor C50 is grounded; a sixth pin of the chip U2, the sixth resistor R6, the second inductor L2, the first resistor R1 and an output interface P1 are connected in sequence, the output interface P1 is grounded, the output interface P1 is connected to the ultra-wideband transmitter; the sixth resistor R6 is connected to the connecting terminal of the second inductor L2 and one terminal of the fifth capacitor C5, the other terminal of the fifth capacitor C5 is grounded; the first resistor R1 is connected to the connecting terminal of the second inductor L2 and one terminal of the third capacitor C3, the other terminal of the third capacitor C3 is connected to the ground terminal of the fifth capacitor C5; an 11th pin of the chip U2 is connected to one terminal of the 50th capacitor C50, the other terminal of the 50th capacitor C50 is connected to the main controller.

Preferably, the GPS positioning module comprises a GPS chip U1, a low noise amplifier chip U3, a surface acoustic wave filter chip U4, a second resistor R2, a third resistor R3, a fourth resistor R4, a sixth capacitor C6, a seventh capacitor C7, a third inductor L3, a fourth inductor L4, a diode D1, a light-emitting diode (LED) D2, a battery B1 and an antenna interface P1; wherein an 11th pin of the GPS chip U1 is connected to a fourth pin of the surface acoustic wave filter chip U4; one terminal of the fourth resistor R4 is connected to eighth and ninth pins of the GPS chip U1, and the other terminal of the fourth resistor R4 is connected to the antenna interface P1 via the third inductor L3, the antenna interface P1 is grounded; a 22th pin of the GPS chip U1, the second resistor R2, the diode D1 and the positive electrode of a power supply are connected in sequence; and the positive electrode of the battery B1 is connected to the 22th pin of the GPS chip U1, the negative electrode is grounded, and a 24th pin of the GPS chip U1 is connected to the negative electrode of the battery B1; a third pin of the GPS chip U1, the third resistor R3, and the LED D2 are connected in sequence, and the negative electrode of the LED D2 is grounded; 18th, 19th, 20th and 21th pins of the GPS chip U1 are SPI bus interfaces, a first pin and a second pin of the GPS chip U1 and the SPI bus interfaces are all connected to the main controller; a first pin of the surface acoustic wave filter chip U4 is connected to a fourth pin of the low noise amplifier U3, a third pin of the low noise amplifier U3, the fourth inductor L4, the sixth capacitor C6 and the antenna interface P1 are connected in sequence; a fifth pin and a sixth pin of the low noise amplifier U3 are connected to the positive electrode of the power supply, and one terminal of the seventh capacitor C7 is connected to the positive electrode of the power supply, the other terminal is grounded.

Preferably, the digitally controlled delay circuit comprises a delay chip U5, a seventh resistor R7, an eighth resistor R8, a ninth resistor R9, a 10th resistor R10, an 11th resistor R11, a 12th resistor R12 and an eighth capacitor C8; first, second, third, fourth, fifth, 23th, 26th, 27th, 29th, 30th, 31th and 32th pins of the delay chip U5 are connected to the main controller; 20th and 21th pins of the delay chip U5 are differential output ports, wherein the 20th pin of the delay chip U5, the seventh resistor R7, the 10th resistor R10, the 11th resistor R11 and the ground port are connected in sequence; one terminal of the 12th resistor R12 is connected to the 10th resistor R10, the other terminal is connected to the ground terminal of the 11th resistor R11; one terminal of the ninth resistor R9 is connected to the positive electrode of a power supply, the other terminal is connected to the terminal of the 10th resistor R10 away from the 11th resistor R11; one terminal of the eighth capacitor C8 is connected to the ground terminal of the 11th resistor R11, the other terminal is connected to the connecting terminals of the ninth resistor R9 and the 10th resistor R10; the 21th pin of the delay chip U5 is connected to the external sampling gate for equivalent sampling via an output interface Po; one terminal of the eighth resistor R8 is connected to the 21th pin of the delay chip U5, the other terminal is connected to the connecting terminals of the ninth resistor R9 and the 10th resistor R10.

Preferably, the analog-to-digital conversion circuit comprises an ADC chip U6, a 13th resistor array R13, a 14th resistor array R14, a 15th resistor array R15, a ninth capacitor C9, a 10th capacitor C10, an 11th capacitor C11, a 12th capacitor C12, and a 49th capacitor C49, wherein 23th, 24th and 25th pins of the ADC chip U6 are connected to the external sampling gate for equivalent sampling, 19th, 20th, 21th and 22th pins of the ADC chip U6 are connected to the ninth capacitor C9, the 10th capacitor C10, the 11th capacitor C11 and the 12th capacitor C12, respectively, and then the ninth capacitor C9, the 10th capacitor C10, the 11th capacitor C11 and the 12th capacitor C12 are grounded; a 15th pin of the ADC chip U6 is connected to one terminal of the 49th capacitor C49 and a power supply, and the other terminal of the 49th capacitor C49 is grounded; second, third, fourth and fifth pins of the ADC chip U6 are connected to one terminal of the 13th resistor array R13, sixth, seventh, eighth and ninth pins are connected to one terminal of the 14th resistor array R14, 10th, 11th and 14th pins are connected to one terminal of the 15th resistor array R15, and the other terminals of the 13th resistor array R13, the 14th resistor array R14 and the 15th resistor array R15 are connected to the main controller; a first pin and a 13th pin of the ADC chip U6 are grounded, the 13th pin of the ADC chip U6 is connected to the power supply.

Preferably, the main controller comprises a XC7Z020CLG484 chip, a DDR3 memory, a network card chip and a SD memory card, the XC7Z020CLG484 chip comprising a FPGA and an ARM processor, wherein the FPGA comprises a GPS control module, a measuring wheel encoder signal receiving module, a receiver and transmitter synchronization control module, a global control module, and two IP cores of AXI DataMover and AXI Interconnect; the two IP cores AXI DataMover and AXI Interconnect are used for data communication between the GPS control module, the global control module and the receiver and transmitter synchronization control module and the ARM processor; the GPS control module is externally connected to the GPS positioning module, and internally connected via AXI4-Lite bus to the AXI Interconnect IP core which is further connected to the global control module and the ARM processor; the measuring wheel encoder signal receiving module is externally connected to the measuring wheel encoder, and internally connected to the global control module and the receiver and transmitter synchronization control module; the receiver and transmitter synchronization control module is externally connected to the synchronous clock generating circuit, the digitally controlled delay circuit and the analog-to-digital conversion circuit, and internally connected to the AXI DataMover IP core via AXI4-Stream bus; the AXI DataMover IP core is further connected to the global control module via AXI4-Stream bus and also connected to a high-performance data bus of the ARM processor via AXI4 bus; the ARM processor is connected to the external SD card, network card chip and DDR3 memory via an on-chip controller.

Compared with the prior art, the present invention has the following beneficial effects:

The present invention reduces the volume of an ultra-wideband ground penetrating radar control system, simplifies the connecting cables of the ultra-wideband radar control system, and improves the reliability of the ultra-wideband radar system.

DETAILED DESCRIPTION OF THE INVENTION

The present invention will be set forth further below with reference to the accompanying drawings and specific embodiments. It should be understood that these examples are merely used to illustrate the present invention and are not intended to limit the scope of the present invention. Various equivalent modifications of the present invention made by those skilled in the art after reading the present invention, all fall within the scope defined by the appended claims of the present application.

Figure 1:
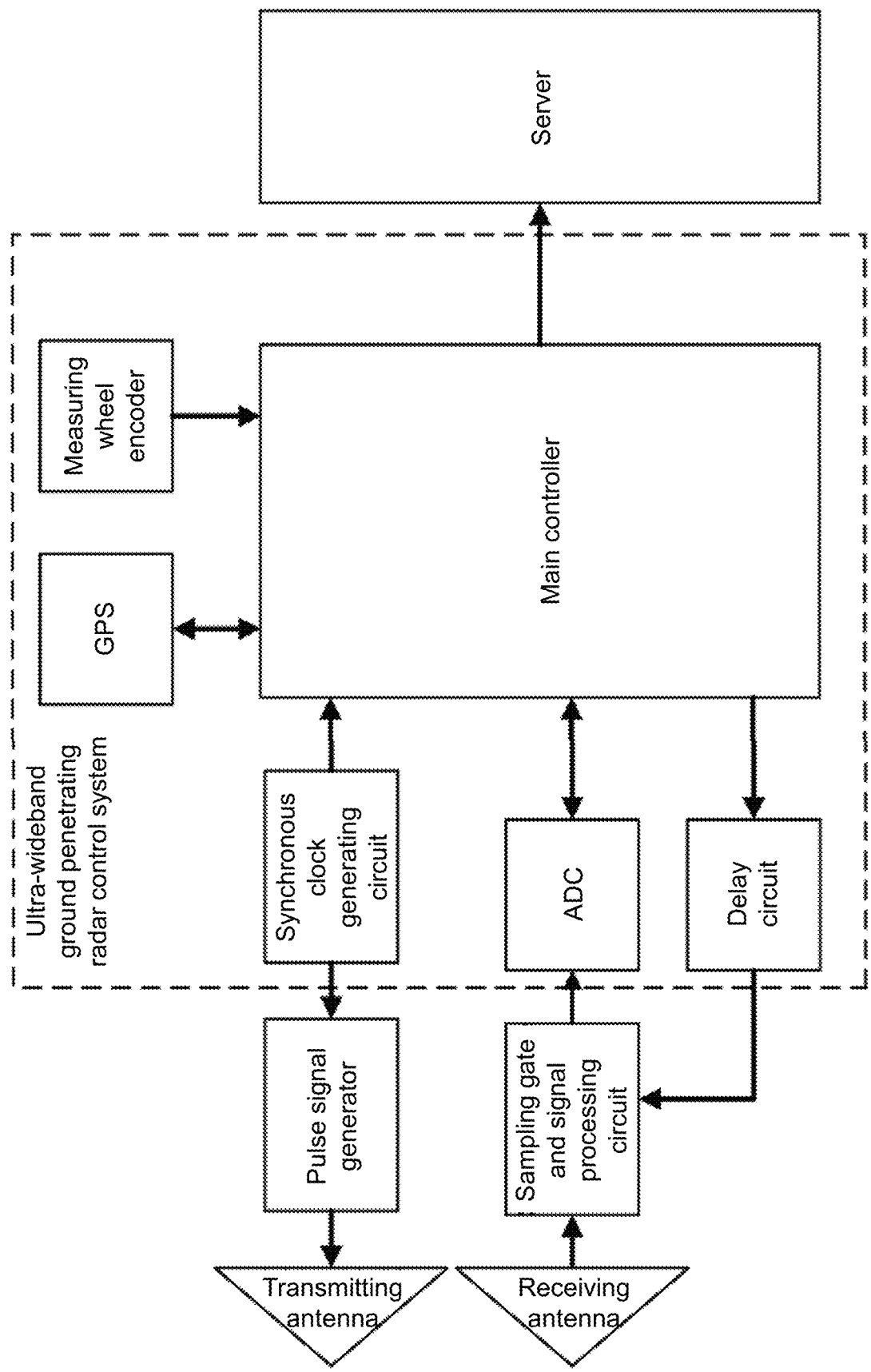
FIG. 1 is a schematic diagram of the application of an ultra-wideband ground penetrating radar control system according to an embodiment of the present invention.
Figure 8:
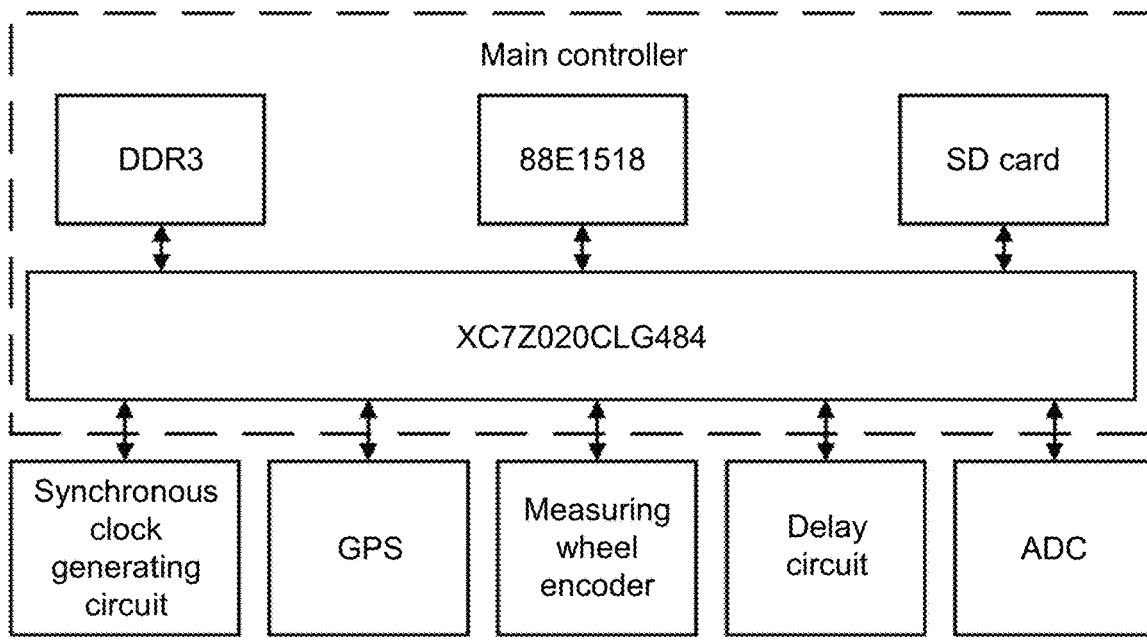
FIG. 8 is a schematic diagram of an ultra-wideband ground penetrating radar control system according to the present invention.

As shown in FIG. 1, within the dashed box is an ultra-wideband ground penetrating radar control system, as shown in FIG. 8, comprising a synchronous clock generating circuit, a GPS positioning module, a measuring wheel encoder module, a digitally controlled delay circuit for equivalent sampling, an ADC circuit and a main controller. The modules and the circuits are all circuits designed with digital devices. The synchronous clock generating circuit, the GPS positioning module, the measuring wheel encoder module, the digitally controlled delay circuit and the ADC circuit are all connected to the main controller; the synchronous clock generating circuit is connected to an ultra-wideband transmitter and receiver; the digitally controlled delay circuit and the ADC circuit are connected to an external sampling gate for equivalent sampling; the main controller is connected to an external server.

Figure 2:
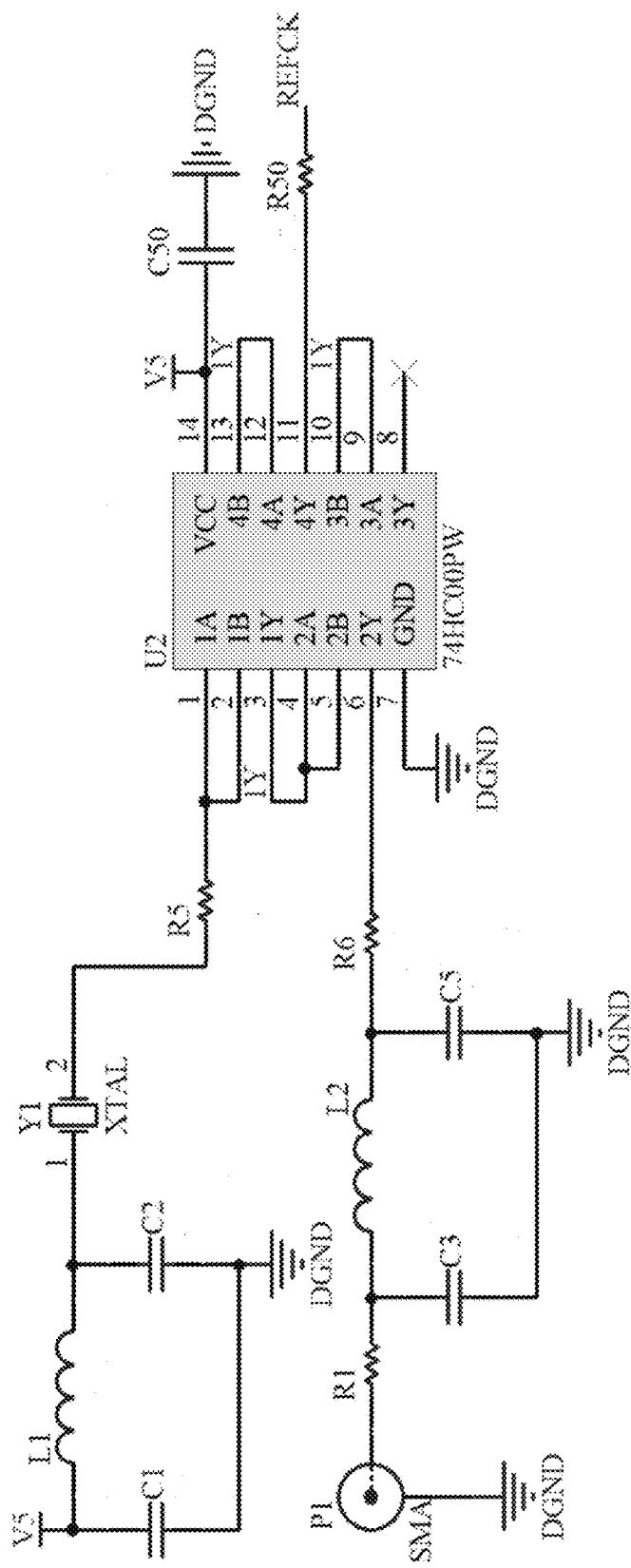
FIG. 2 is a circuit diagram of a synchronous clock generating circuit according to an embodiment of the present invention.

As shown in FIG. 2, the synchronous clock generating circuit comprises a crystal oscillator Y1, a 74HC00 chip U2, a first resistor R1, a fifth resistor R5, a sixth resistor R6, a 50th resistor R50, a first capacitor C1, a second capacitor C2, a third capacitor C3, a fifth capacitor C5, a 50th capacitor C50, a first inductor L1 and a second inductor L2, wherein a first pin of the crystal oscillator Y1 is connected to the positive electrode of a power supply via the first inductor L1; one terminal of the second capacitor C2 is connected to the first pin of the crystal oscillator Y1, the other terminal is grounded; one terminal of the first capacitor C1 is connected to the positive electrode of the power supply, the other terminal is connected to the ground terminal of the second capacitor C2; one terminal of the fifth resistor R5 is connected to a second pin of the crystal oscillator Y1, the other terminal is connected to a first pin and a second pin of the chip U2; third, fourth, fifth, ninth, 10th, 11th and 13th pins of the 74HC00 chip U2 are connected together; a 14th pin of the chip U2, the positive electrode of the 5V power supply and one terminal of the 50th capacitor C50 are connected, and the other terminal of the 50th capacitor C50 is grounded; a sixth pin of the chip U2, the sixth resistor R6, the second inductor L2, the first resistor R1 and an output interface P1 are connected in sequence, the output interface P1 is grounded, the output interface P1 is connected to the ultra-wideband transmitter; the sixth resistor R6 is connected to the connecting terminal of the second inductor L2 and one terminal of the fifth capacitor C5, the other terminal of the fifth capacitor C5 is grounded; the first resistor R1 is connected to the connecting terminal of the second inductor L2 and one terminal of the third capacitor C3, the other terminal of the third capacitor C3 is connected to the ground terminal of the fifth capacitor C5; an 11th pin of the 74HC00 chip U2 is connected to one terminal of the 50th capacitor C50, the other terminal of the 50th capacitor C50 is connected to the main controller.

Figure 3:
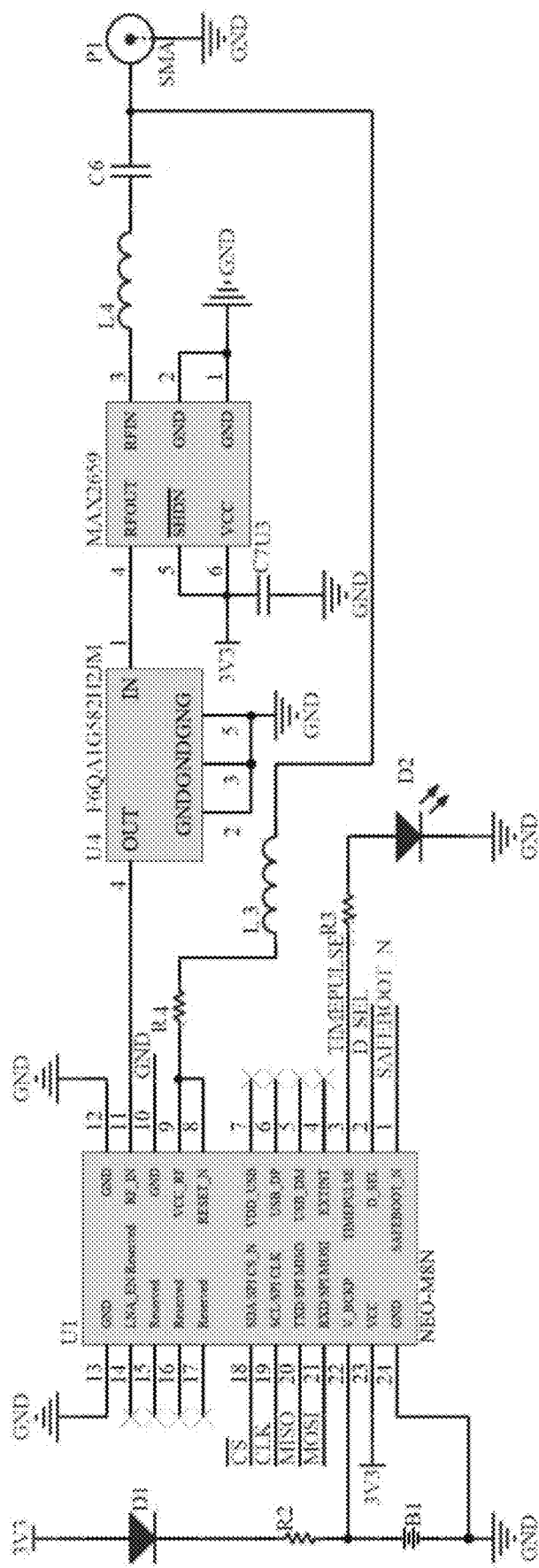
FIG. 3 is a circuit diagram of a GPS positioning module according to an embodiment of the present invention.

As shown in FIG. 3, the GPS positioning module comprises a NEO-M8N GPS chip U1, a MAX2659 low noise amplifier chip U3, a F6QA1G582H2JM surface acoustic wave filter chip U4, a second resistor R2, a third resistor R3, a fourth resistor R4, a sixth capacitor C6, a seventh capacitor C7, a third inductor L3, a fourth inductor L4, a diode D1, a light-emitting diode (LED) D2, a battery B1 and an antenna interface P1; wherein an 11th pin of the GPS chip U1 is connected to a fourth pin of the surface acoustic wave filter chip U4; one terminal of the fourth resistor R4 is connected to eighth and ninth pins of the GPS chip U1, and the other terminal of the fourth resistor R4 is connected to the antenna interface P1 via the third inductor L3, the antenna interface P1 is grounded; a 22th pin of the GPS chip U1, the second resistor R2, the diode D1 and the positive electrode of a 3.3V power supply are connected in sequence; and the positive electrode of the battery B1 is connected to the 22th pin of the GPS chip U1, the negative electrode is grounded, and a 24th pin of the GPS chip U1 is connected to the negative electrode of the battery B1; a third pin of the GPS chip U1, the third resistor R3, and the LED D2 are connected in sequence, and the negative electrode of the LED D2 is grounded; 18th, 19th, 20th and 21th pins of the GPS chip U1 are SPI bus interfaces, a first pin and a second pin of the GPS chip U1 and the SPI bus interfaces are all connected to the main controller; a first pin of the surface acoustic wave filter chip U4 is connected to a fourth pin of the low noise amplifier U3, a third pin of the low noise amplifier U3, the fourth inductor L4, the sixth capacitor C6 and the antenna interface P1 are connected in sequence; a fifth pin and a sixth pin of the low noise amplifier U3 are connected to the positive electrode of the 3.3V power supply, and one terminal of the seventh capacitor C7 is connected to the positive electrode of the power supply, the other terminal is grounded.

Figure 4:
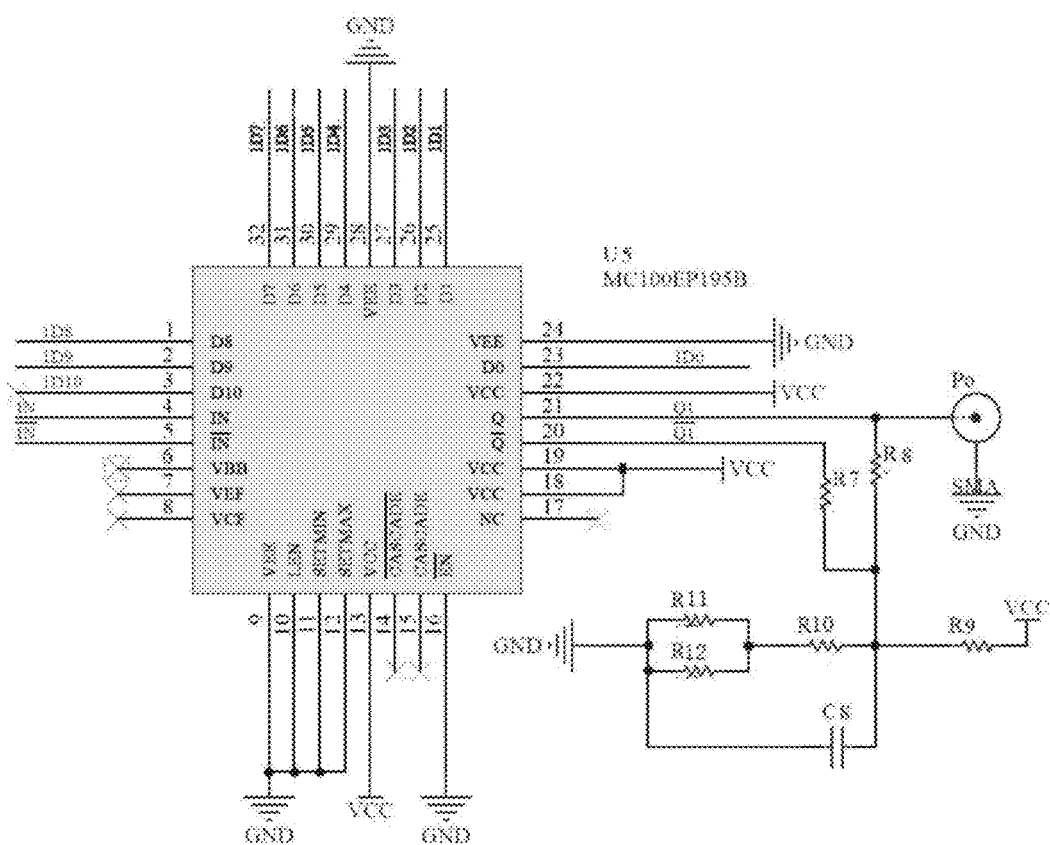
FIG. 4 is a circuit diagram of a digitally controlled delay circuit according to an embodiment of the present invention.

As shown in FIG. 4, the digitally controlled delay circuit comprises a MC100EP195B programmable delay chip U5, a seventh resistor R7, an eighth resistor R8, a ninth resistor R9, a 10th resistor R10, an 11th resistor R11, a 12th resistor R12 and an eighth capacitor C8. First, second, third, fourth, fifth, 23th, 26th, 27th, 29th, 30th, 31th and 32th pins of the delay chip U5 are connected to the main controller. 20th and 21th pins of the delay chip U5 are differential output ports, and according to the MC100EP195B data manual, these two pins both need to connect to a voltage level 2V lower than a power supply voltage VCC via a 50Ω resistor. The VCC is 3.3 V, and 1.3 V voltage is obtained by a voltage divider network of the ninth resistor R9, 10th resistor R10, 11th resistor R11 and 12th resistor R12, that is connected to the 20th and 21th pins of the delay chip U5 via the seventh resistor R7 and the eighth resistor R8. Also, the 21th pin of the delay chip U5 is connected to an output interface Po for connecting to the external sampling gate for equivalent sampling. The 20th pin of the delay chip U5, the seventh resistor R7, the 10th resistor R10, the 11th resistor R11 and the ground port are connected in sequence; one terminal of the 12th resistor R12 is connected to the 10th resistor R10, the other terminal is connected to the ground terminal of the 11th resistor R11; one terminal of the ninth resistor R9 is connected to the positive electrode of the power supply, the other terminal is connected to the terminal of the 10th resistor R10 away from the 11th resistor R11; one terminal of the eighth capacitor C8 is connected to the ground terminal of the 11th resistor R11, the other terminal is connected to the connecting terminals of the ninth resistor R9 and the 10th resistor R10; the 21th pin of the delay chip U5 is connected to the external sampling gate for equivalent sampling via the output interface Po; one terminal of the eighth resistor R8 is connected to the 21th pin of the delay chip U5, the other terminal is connected to the connecting terminals of the ninth resistor R9 and the 10th resistor R10.

Figure 5:
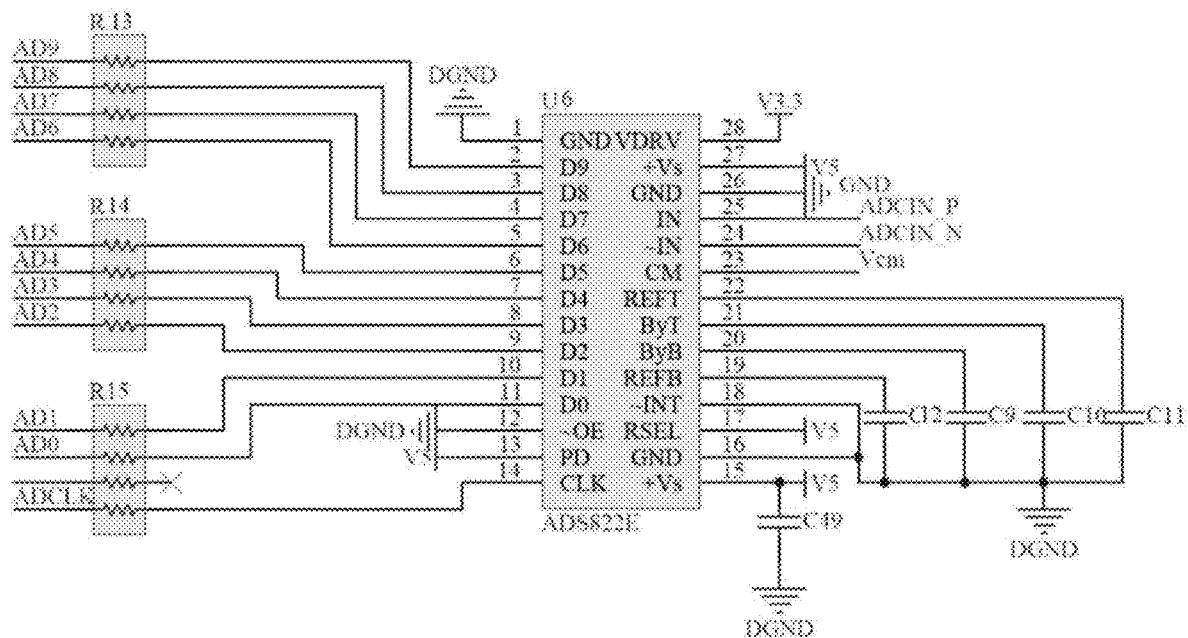
FIG. 5 is a circuit diagram of an analog-to-digital conversion (ADC) circuit according to an embodiment of the present invention.

As shown in FIG. 5, the ADC circuit comprises an ADC chip U6 of model ADS822, a 13th resistor array R13, a 14th resistor array R14, a 15th resistor array R15, a ninth capacitor C9, a 10th capacitor C10, an 11th capacitor C11, a 12th capacitor C12, and a 49th capacitor C49, wherein 23th, 24th and 25th pins of the ADC chip U6 are connected to the external sampling gate for equivalent sampling, 19th, 20th, 21th and 22th pins of the ADC chip U6 are connected to the ninth capacitor C9, the 10th capacitor C10, the 11th capacitor C11 and the 12th capacitor C12, respectively, and then the ninth capacitor C9, the 10th capacitor C10, the 11th capacitor C11 and the 12th capacitor C12 are grounded; a 15th pin of the ADC chip U6 is connected to one terminal of the 49th capacitor C49 and a 5V power supply, and the other terminal of the 49th capacitor C49 is grounded; second, third, fourth and fifth pins of the ADC chip U6 are connected to one terminal of the 13th resistor array R13, sixth, seventh, eighth and ninth pins are connected to one terminal of the 14th resistor array R14, and 10th, and 11th and 14th pins are connected to one terminal of the 15th resistor array R15, and the other terminals of the 13th resistor array R13, the 14th resistor array R14 and the 15th resistor array R15 are connected to the main controller; a first pin and a 13th pin of the ADC chip U6 are grounded, and the 13th pin of the ADC chip U6 is connected to the power supply.

Figure 6:
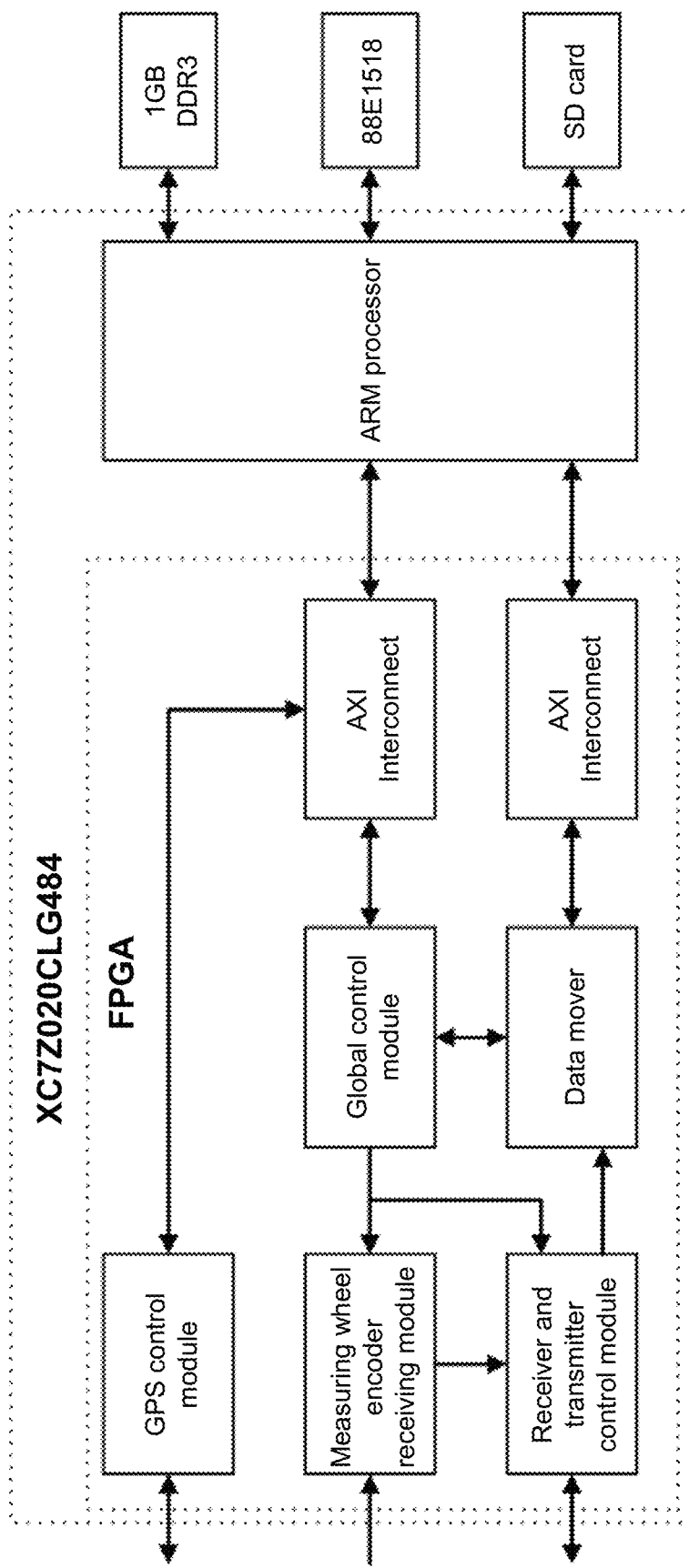
FIG. 6 is a schematic diagram of the structure of a main controller according to an embodiment of the present invention.

As shown in FIG. 6, the main controller comprises a XC7Z020CLG484 chip, a 1 GB DDR3 memory, a 88E1518 network card chip and a SD memory card, the XC7Z020CLG484 chip comprising a FPGA and an ARM processor, wherein the FPGA comprises a GPS control module, a measuring wheel encoder signal receiving module, a receiver and transmitter synchronization control module, a global control module, and two IP cores of AXI DataMover and AXI Interconnect; the two cores AXI DataMover and AXI Interconnect IP are called for data communication between the GPS control module, the global control module and the receiver and transmitter synchronization control module and the ARM processor; the GPS control module is externally connected to the GPS positioning module, and internally connected via AXI4-Lite bus to the AXI Interconnect IP core which is further connected to the global control module and the ARM processor; the measuring wheel encoder signal receiving module is externally connected to the measuring wheel encoder, and internally connected to the global control module and the receiver and transmitter synchronization control module; the receiver and transmitter synchronization control module is externally connected to the synchronous clock generating circuit, the digitally controlled delay circuit and the analog-to-digital conversion circuit, and internally connected to the AXI DataMover IP core via AXI4-Stream bus; the AXI DataMover IP core is further connected to the global control module via AXI4-Stream bus and also connected to a high-performance data bus of the ARM processor via AXI4 bus; the ARM processor is connected to the external SD card, network card chip and DDR3 memory via an on-chip controller.

Figure 7:
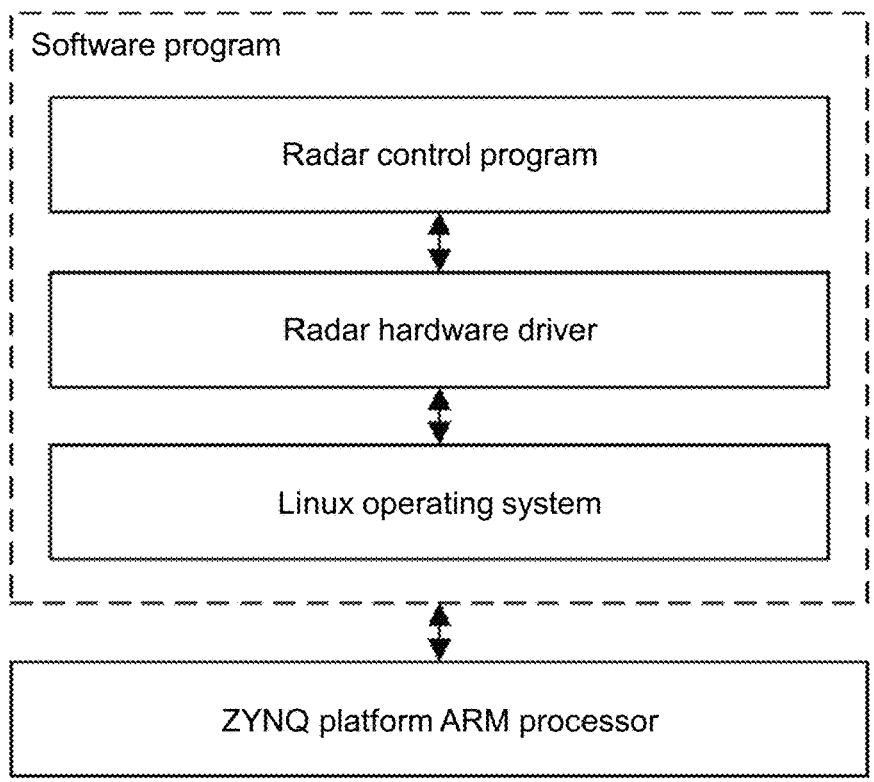
FIG. 7 is a schematic diagram of a control system software according to the present invention.

As shown in FIG. 7, the control system software comprises a Linux operating system, a radar hardware driver and a radar control program. The Linux operating system is stored in the SD card, and the ARM processor transfers the operating system on the SD card to the DDR3 memory and runs the same. The radar control program runs on the Linux operating system, and controls the hardware circuit of the ultra-wideband ground penetrating radar control system and obtains radar data by calling the radar hardware driver. Also, the radar control program sends the radar data obtained by the hardware to the server by calling Linux's own network card driver.

The above are only the preferred implementations of the present invention. It should be noted that, several improvements and modifications may be made by those of ordinary skill in the art without departing from the principle of the present invention, and these improvements and modifications should also be considered within the protection scope of the present invention.

What is claimed is:
1. An ultra-wideband ground penetrating radar control system, comprising:
a synchronous clock generating circuit,
a GPS positioning module,
a measuring wheel encoder module,
a digitally controlled delay circuit for equivalent sampling,
an analog-to-digital conversion circuit, and
a main controller, wherein the synchronous clock generating circuit, the GPS positioning module, the measuring wheel encoder module, the digitally controlled delay circuit and the analog-to-digital conversion circuit are all connected to the main controller;
the synchronous clock generating circuit is connected to an ultra-wideband transmitter and receiver;
the digitally controlled delay circuit and the analog-to-digital conversion circuit are connected to an external sampling gate for equivalent sampling;
the main controller is connected to an external server,
the synchronous clock generating circuit comprises a crystal oscillator, a chip, a first resistor, a fifth resistor, a sixth resistor, a 50th resistor, a first capacitor, a second capacitor, a third capacitor, a fifth capacitor, a 50th capacitor, a first inductor and a second inductor, wherein
a first pin of the crystal oscillator is connected to the positive electrode of a power supply via the first inductor;
one terminal of the second capacitor is connected to the first pin of the crystal oscillator, the other terminal of the second capacitor is grounded;
one terminal of the first capacitor is connected to the positive electrode of the power supply, the other terminal of the first capacitor is connected to the ground terminal of the second capacitor;
one terminal of the fifth resistor is connected to a second pin of the crystal oscillator, the other terminal of the fifth resistor is connected to a first pin and a second pin of the chip;
third, fourth, fifth, ninth, 10th, 11th and 13th pins of the chip are connected together;
a 14th pin of the chip, the positive electrode of the power supply and one terminal of the 50th capacitor are connected, and the other terminal of the 50th capacitor is grounded;
a sixth pin of the chip, the sixth resistor, the second inductor, the first resistor and an output interface are connected in sequence, the output interface is grounded, the output interface is connected to the ultra-wideband transmitter;
the sixth resistor is connected to the connecting terminal of the second inductor and one terminal of the fifth capacitor, the other terminal of the fifth capacitor is grounded;
the first resistor is connected to the connecting terminal of the second inductor and one terminal of the third capacitor, the other terminal of the third capacitor is connected to a ground terminal of the fifth capacitor;
an 11th pin of the chip is connected to one terminal of the 50th capacitor, the other terminal of the 50th capacitor is connected to the main controller,
the GPS positioning module comprises a GPS chip, a low noise amplifier chip, a surface acoustic wave filter chip, a second resistor, a third resistor, a fourth resistor, a sixth capacitor, a seventh capacitor, a third inductor, a fourth inductor, a diode, a light-emitting diode (LED), a battery and an antenna interface; wherein
an 11th pin of the GPS chip is connected to a fourth pin of the surface acoustic wave filter chip;
one terminal of the fourth resistor is connected to eighth and ninth pins of the GPS chip, and the other terminal of the fourth resistor is connected to the antenna interface via the third inductor, the antenna interface is grounded;

a 22th pin of the GPS chip, the second resistor, the diode and the positive electrode of a power supply are connected in sequence;

and the positive electrode of the battery is connected to the 22th pin of the GPS chip, the negative electrode of the battery is grounded, and a 24th pin of the GPS chip is connected to the negative electrode of the battery;

a third pin of the GPS chip, the third resistor, and the LED are connected in sequence, and the negative electrode of the LED is grounded;

18th, 19th, 20th and 21th pins of the GPS chip are SPI bus interfaces, a first pin and a second pin of the GPS chip and the SPI bus interfaces are all connected to the main controller;

a first pin of the surface acoustic wave filter chip is connected to a fourth pin of the low noise amplifier, a third pin of the low noise amplifier, the fourth inductor, the sixth capacitor and the antenna interface are connected in sequence;

a fifth pin and a sixth pin of the low noise amplifier are connected to the positive electrode of the power supply, and one terminal of the seventh capacitor is connected to the positive electrode of the power supply, the other terminal of the seventh capacitor is grounded, the digitally controlled delay circuit comprises a delay chip, a seventh resistor, an eighth resistor, a ninth resistor, a 10th resistor, an 11th resistor, a 12th resistor and an eighth capacitor;

first, second, third, fourth, fifth, 23th, 26th, 27th, 29th, 30th, 31th and 32th pins of the delay chip are connected to the main controller;

20th and 21th pins of the delay chip are differential output ports, wherein the 20th pin of the delay chip, the seventh resistor, the 10th resistor, the 11th resistor and a ground port are connected in sequence;

one terminal of the 12th resistor is connected to the 10th resistor, the other terminal of the 10th resistor is connected to the ground terminal of the 11th resistor;

one terminal of the ninth resistor is connected to the positive electrode of a power supply, the other terminal of the ninth resistor is connected to a second terminal of the 10th resistor away from the 11th resistor;

one terminal of the eighth capacitor is connected to the ground terminal of the 11th resistor, the other terminal of the 11th resistor is connected to the connecting terminals of the ninth resistor and the 10th resistor;

the 21th pin of the delay chip is connected to the external sampling gate for equivalent sampling via a second output interface;

one terminal of the eighth resistor is connected to the 21th pin of the delay chip, the other terminal of the eighth resistor is connected to the connecting terminals of the ninth resistor and the 10th resistor, the analog-to-digital conversion circuit comprises an ADC chip, a 13th resistor array, a 14th resistor array, a 15th resistor array, a ninth capacitor, a 10th capacitor, an 11th capacitor, a 12th capacitor, and a 49th capacitor, wherein 23th, 24th and 25th pins of the ADC chip are connected to the external sampling gate for equivalent sampling, 19th, 20th, 21th and 22th pins of the ADC chip are connected to the ninth capacitor, the 10th capacitor, the 11th capacitor and the 12th capacitor, respectively, and then the ninth capacitor, the 10th capacitor, the 11th capacitor and the 12th capacitor are grounded;

a 15th pin of the ADC chip is connected to one terminal of the 49th capacitor and a power supply, and the other terminal of the 49th capacitor is grounded;

second, third, fourth and fifth pins of the ADC chip are connected to one terminal of the 13th resistor array, sixth, seventh, eighth and ninth pins are connected to one terminal of the 14th resistor array, 10th, 11th and 14th pins are connected to one terminal of the 15th resistor array, and the other terminals of the 13th resistor array, the 14th resistor array and the 15th resistor array are connected to the main controller;

a first pin and a 13th pin of the ADC chip are grounded, the 13th pin of the ADC chip is connected to the power supply, the main controller comprises a XC7Z020CLG484 chip, a DDR3 memory, a network card chip and a SD memory card, the XC7Z020CLG484 chip comprising a FPGA and an ARM processor, wherein the FPGA comprises a GPS control module, a measuring wheel encoder signal receiving module, a receiver and transmitter synchronization control module, a global control module, and two Intellectual Property IP cores of Advanced Extensible Interface AXI DataMover and AXI Interconnect;

the two IP cores AXI DataMover and AXI Interconnect are used for data communication between the GPS control module, the global control module and the receiver and transmitter synchronization control module and the ARM processor;

the GPS control module is externally connected to the GPS positioning module, and internally connected via AXI4-Lite bus to the AXI Interconnect IP core, the AXI Interconnect IP core is further connected to the global control module and the ARM processor;

the measuring wheel encoder signal receiving module is externally connected to the measuring wheel encoder, and internally connected to the global control module and the receiver and transmitter synchronization control module;

the receiver and transmitter synchronization control module is externally connected to the synchronous clock generating circuit, the digitally controlled delay circuit and the analog-to-digital conversion circuit, and internally connected to the AXI DataMover IP core via AXI4-Stream bus;

the AXI DataMover IP core is further connected to the global control module via AXI4-Stream bus and also connected to a high-performance data bus of the ARM processor via AXI4 bus;

the ARM processor is connected to the external SD card, the network card chip and the DDR3 memory via an on-chip controller, a control system software comprises a Linux operating system, a radar hardware driver and a radar control program, wherein the Linux operating system is stored in the external SD card, and the ARM processor transfers the Linux operating system on the external SD card to the DDR3 memory and runs the Linux operating system, the radar control program runs on the Linux operating system, and controls a hardware circuit of the ultra-wideband ground penetrating radar control system and obtains radar data by calling the radar hardware driver, and also, the radar control program sends the radar data obtained by the hardware circuit to the external server by calling a network card driver of the Linux operating system.

* * * * *